US008062444B2

United States Patent
Begon et al.

(10) Patent No.: US 8,062,444 B2
(45) Date of Patent: Nov. 22, 2011

(54) APPARATUS FOR CONFORMING A PLANAR FILM ON AN OPTICAL LENS, METHOD FOR FUNCTIONALIZING AN OPTICAL LENS BY MEANS OF SAID APPARATUS, THE OPTICAL LENS SO-OBTAINED

(75) Inventors: Cédric Begon, Charenton le Pont (FR); Christelle Defranco, Charenton le Pont (FR); Gilles Menges, Charenton le Pont (FR)

(73) Assignee: Essilor International (compagnie Generale d'optique), Charenton le Pont (FR)

( * ) Notice: Subject to any disclaimer, the term of this patent is extended or adjusted under 35 U.S.C. 154(b) by 555 days.

(21) Appl. No.: 11/910,557

(22) PCT Filed: Apr. 4, 2006

(86) PCT No.: PCT/EP2006/003972
§ 371 (c)(1),
(2), (4) Date: Jun. 11, 2008

(87) PCT Pub. No.: WO2006/105999
PCT Pub. Date: Oct. 12, 2006

(65) Prior Publication Data
US 2008/0314499 A1  Dec. 25, 2008

(30) Foreign Application Priority Data
Apr. 4, 2005 (FR) .................................. 05 03306

(51) Int. Cl.
*B32B 37/00* (2006.01)
(52) U.S. Cl. .......... 156/64; 156/152; 156/230; 156/248; 156/251; 156/350; 156/351; 156/358; 156/367; 156/368; 156/378; 156/379

(58) Field of Classification Search ............. 156/64, 156/350, 351, 358, 367, 368, 378, 379, 152, 156/230, 248, 251, 344
See application file for complete search history.

(56) References Cited

U.S. PATENT DOCUMENTS
4,242,162 A  12/1980  Edwards et al.
(Continued)

FOREIGN PATENT DOCUMENTS
DE  19520328  12/1996
(Continued)

OTHER PUBLICATIONS

Thermal Tech Equipment, "Shore Durometer Conversion Chart", http://www.ttequip.com/KnowledgeLibrary/TechPageShoreDurometerConversionChart.htm.* Thermal Tech Equipment, "Shore Durometer Conversion Chart", Jun. 4, 2006, http://www.ttequip.com/KnowledgeLibrary/TechPageShoreDurometerConversionChart.htm.*

*Primary Examiner* — Katarzyna Wyrozebski Lee
*Assistant Examiner* — Joshel Rivera
(74) *Attorney, Agent, or Firm* — Occhiuti Rohlicek & Tsao LLP

(57) ABSTRACT

The present invention relates to an apparatus for conforming a functionalized flexible planar film on an optical lens. The apparatus according to the invention may also be used in a process of functionalization of an optical lens. As a factor of the functionalization that one wishes to introduce into said optical lens and the nature of the functionalized flexible planar film used, the functionalization process is a process of gluing, transfer, or molding of a functionalized flexible planar film onto an optical lens. The implementation of each of these respective processes makes it possible to obtain a functionalized optical lens, said functionalization being adhered, transferred, or molded using a functionalized flexible planar film.

26 Claims, 6 Drawing Sheets

U.S. PATENT DOCUMENTS

Figure 1:
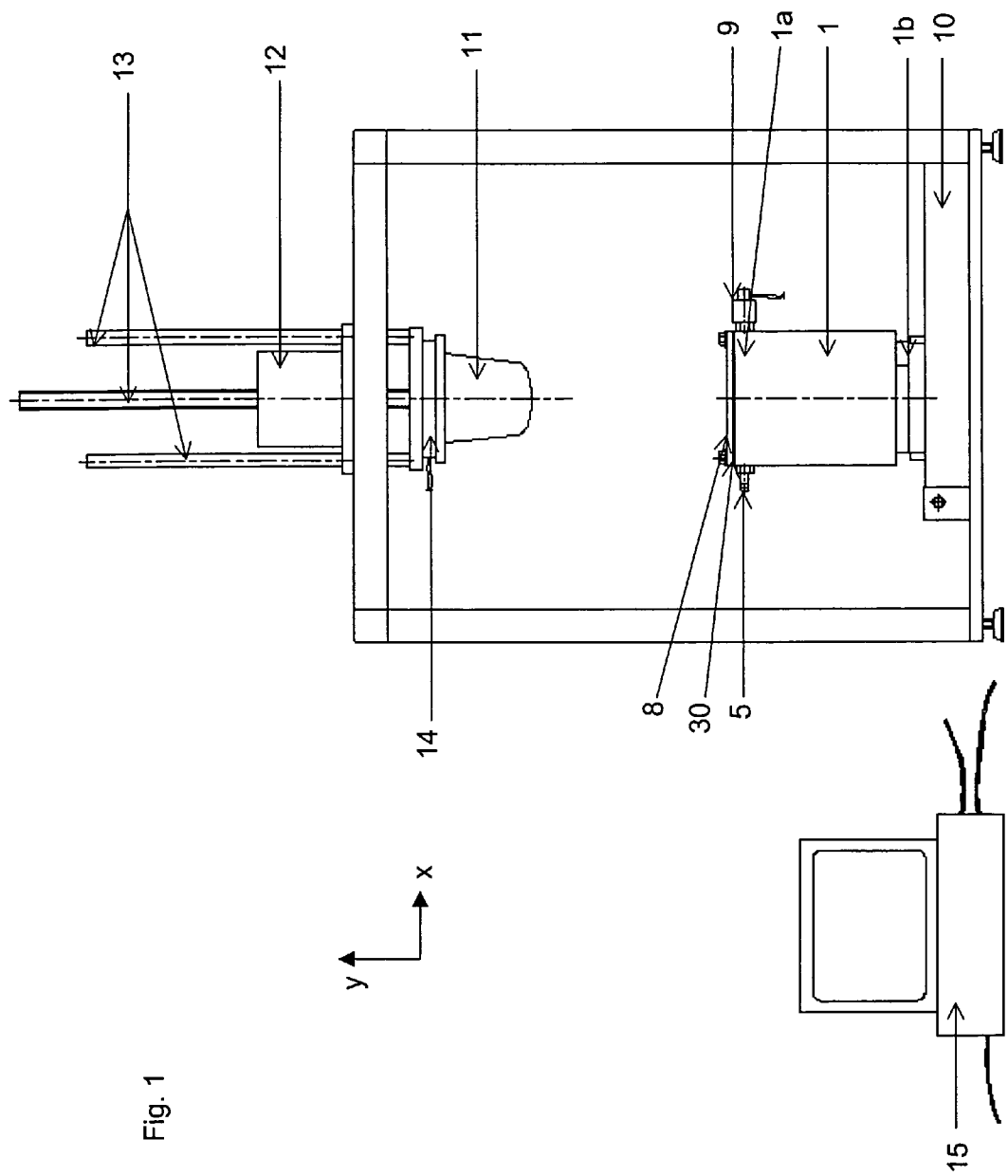

| | | | |
|---|---|---|---|
| 4,826,548 A * | 5/1989 | Herbin et al. | 156/152 |
| 4,865,670 A | 9/1989 | Marks | |
| 4,959,118 A | 9/1990 | Herbin et al. | |
| 6,106,665 A | 8/2000 | Wood et al. | |
| 6,716,294 B1 | 4/2004 | Vetrini | |
| 2001/0038438 A1* | 11/2001 | Beeloo et al. | 351/162 |
| 2004/0194880 A1* | 10/2004 | Jiang et al. | 156/285 |
| 2007/0034321 A1* | 2/2007 | Glacet et al. | 156/230 |

FOREIGN PATENT DOCUMENTS

| | | |
|---|---|---|
| EP | 0146199 | 6/1985 |
| EP | 0285490 | 10/1988 |
| EP | 1182655 | 2/2002 |
| WO | WO97/35216 | 9/1997 |
| WO | WO99/29494 | 6/1999 |

* cited by examiner

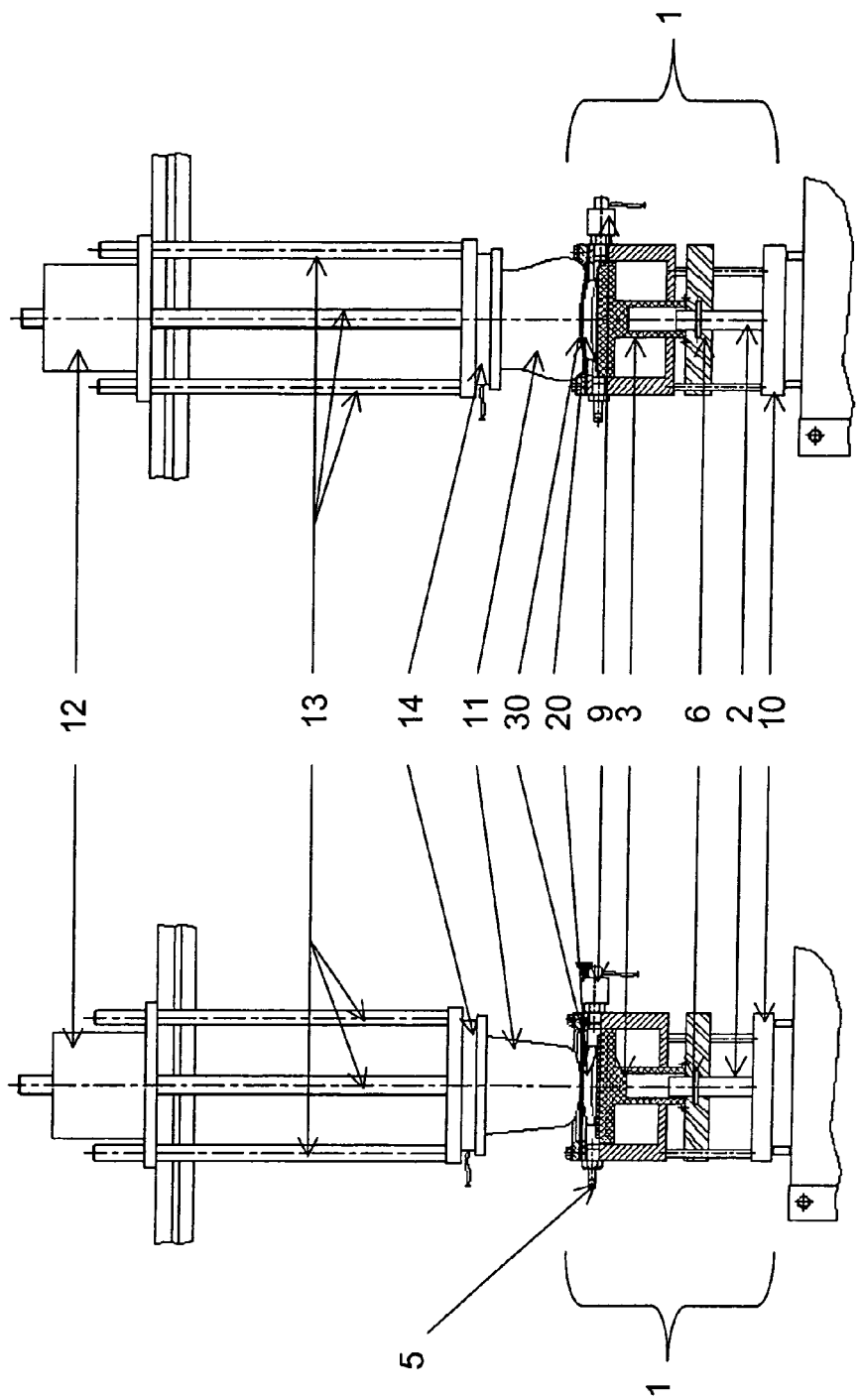

APPARATUS FOR CONFORMING A PLANAR FILM ON AN OPTICAL LENS, METHOD FOR FUNCTIONALIZING AN OPTICAL LENS BY MEANS OF SAID APPARATUS, THE OPTICAL LENS SO-OBTAINED

CROSS-REFERENCE TO RELATED APPLICATIONS

This application is being filed as a U.S. National Stage under 35 U.S.C. 371 of International Application No. PCT/EP2006/003972, filed on Apr. 4, 2006, which claims the benefit of French Application No. 0503306, filed Apr. 4, 2005, the contents of which is hereby incorporated by reference in its entirety.

The present invention relates to an apparatus for conforming a functionalized flat flexible film on an optical lens. A further object of the invention is a method for adhering, transferring or molding a functionalized flat flexible film to an optical lens by means of said conformation apparatus. A final object of the invention is a functionalized optical lens, said functionalization being obtained by gluing, transfer, or molding of a functionalized flat flexible film onto an optical lens by using the conformation apparatus.

A number of citations describe means and methods making it possible to apply a film to an optical lens. Among these documents patent application WO 97/35216 can be cited which claims an apparatus for laminating a film onto an ophthalmic lens. U.S. Pat. No. 4,865,670 claims a method for manufacturing a polarized lens by the application of pressure on a polarized film, said pressure allowing the establishment of contact between said film and said lens. U.S. Pat. No. 6,106,665 likewise describes an apparatus making it possible to establish the contact between a functionalized film and an optical lens, the contact between these two bodies being made permanent under the effects of irradiation of the adhesive present between the film and said lens.

All of these means and associated methods make it possible to obtain functionalized optical lenses using an optical lens and a functionalized film. However, their reproducibility and their conditions of use are rather limited. It is in fact difficult to realize functionalization of an optical lens having a concave surface or utilization of these means on films having a low expansion property. The present invention thus proposes applying a technical solution to these limitations by using an apparatus for conforming a functionalized flexible planar film onto an optical lens regardless of the nature of the film both in its functionality and in its intrinsic characteristics, and the radius of curvature of the lens.

In a first embodiment, the invention relates to an apparatus for conforming a functionalized flexible planar film on an optical lens, characterized in that it comprises:
an apparatus (1) comprising a mechanical piston (2) and a plate (3) mounted above said mechanical piston (2);
said piston being capable of presenting a vertical translational movement along the axis (y), within said module (1);
a mechanical anti-return device (6) for said piston (2) capable of blocking the plate (3) at a determined height on the inside of the module (1);
a lens-carrier (7) positioned on the top face of the plate (3), comprising means capable of holding an optical lens (20);
a film carrier (8) capable of holding a flat flexible film (30), said film carrier comprising a holding device (9) making it possible to position and locking said film carrier on the module (1) at its upper end (1a), the locking involving the hermetic closure of said module (1);
a stamp (11) situated vertical to the module;
electrical, pneumatic or mechanical translation means (12) connecting said stamp (11) to a support shaft (13), said means (12) being capable of effecting controlled vertical and/or horizontal movements of the stamp (11);
actuation of the stamp (11), the piston (2), the translation means (12), according to a predetermined sequence and governed by an automatic device (15) makes it possible to establish the contact between the stamp (11), the flexible planar film (30) and the optical lens (20) until obtaining a conformal contact between said optical lens and said film.

In a second variant embodiment, the invention relates to an apparatus for conforming a functionalized flexible planar film on an optical lens, characterized in that it comprises:
a module (1) comprising a mechanical piston (2) and a plate (3) mounted above said mechanical piston (2);
said module being connected by its vacuum chamber (4) to a vacuum device (5) capable of creating a vacuum within said vacuum chamber (4);
said vacuum effecting, by a pneumatic effect, a vertical translational movement ascending along the axis (y) of said mechanical piston (2) inside said module (1);
a mechanical anti-return device (6) of said piston (2) capable of blocking the plate (3) at a determined height inside the module (1) when the vacuum device means (5) are operated;
a lens-holder (7) positioned on the top face of the plate (3), comprising means capable of holding an optical lens (20);
a film carrier (8) capable of holding a flat flexible film (30), said film carrier comprising a holding device (9) making it possible to position and locking said film carrier on the module (1) at its upper end (1a), the locking involving the closure of said module (1);
a stamp (11) situated vertical to the module;
electrical, pneumatic or mechanical translation means (12) connecting said stamp (11) to a support shaft (13), said means (12) being capable of effecting controlled vertical and/or horizontal movements of the stamp (11);
actuation of the stamp (11), the vacuum device (5), the translation means (12), according to a predetermined sequence and governed by an automatic device (15) makes it possible to establish the contact between the stamp (11), the flexible planar film (30) and the optical lens (20) until obtaining a conformal contact between said optical lens and said film.

In this second variant embodiment, the module in which the lens (20) is held by its lens carrier comprises vacuum means capable of creating a vacuum in the vacuum device of said module. This vacuum in this particular embodiment makes it possible to induce a vertical translational movement of the piston supporting the lens carrier. Thus, in this configuration the movements of vertical translation of the lens inside the module are induced by a pressure variation inside said module. The conforming or shaping apparatus according to the first variant of the invention makes it possible in terms of method to achieve the same results. Only the means utilized for the translational movement of the piston and thus of the lens carrier and of the lens are different. In the meaning of the invention, by mechanical piston it is understood a piston driven by electrical and/or pneumatic means. In the first variant the means of translation are an integral part of the piston and are under electrical or pneumatic control; in the second embodiment these means are de-coupled from the piston itself and are under the control of the vacuum effected within the module, the pressure variations being capable of inducing translational movements in said piston. In this second embodiment, the mechanical piston is driven by pneumatic means.

In the context of the invention, the conforming apparatus is comprised in such a fashion that the translational movement induced at the piston is continuous and controlled. In the first variant utilizing a module without a vacuum means, the movement of the piston is actually controlled by a position sensor advantageously situated at the level of said piston and connected to the automatic device.

In the second variant the apparatus is comprised in such a fashion that the vacuum within the vacuum chamber (4) of the module (1) is continuous and controlled by means of a pressure sensor or by a pressure gauge connected to the automatic device.

The apparatus in its two variants may, in addition, comprise an adaptor base (10) comprising:
  module fixation means (1) for its lower end (1b),
  mechanical means making possible a horizontal translation (along the x axis) of said module (1) on said base (10)
  said adaptor base (10) being connected to a position sensor capable of controlling the relative position along the axis (y) or the module (1) relative to the stamp (11).

This type of apparatus allows moving the module comprising the lens on a horizontal plane, making it thus possible to combine several operations in the same apparatus.

In order to make it possible to control all of the parameters that can influence the procedures in which the apparatus according to the invention is used, the conforming apparatus advantageously comprises a force sensor and/or a position sensor (14) capable of controlling the means of electrical, pneumatic or mechanical translation (12) of the stamp (11).

The combination of the action of a piston in a closed module and of a stamp, in a programmed and controlled sequence, notably by virtue of the presence of an automatic device, of force and/or position sensors, makes it possible to obtain an apparatus for conforming a functionalized flexible planar film whose capacities are reproducible. This reproducibility is due to the control of the forces applied in combination by the stamp and by the piston via the lens support, on the film and on the lens. The quality of the conformal contact between the optical lens and the flexible planar film is ensured by said programmed and controlled sequence. This sequence is characterized by three steps:
  the descent of the stamp up to its contact with the film up to a pressure threshold P1 (or position threshold Z1), this first step allowing the performing of the planar film;
  the initiation of the conformal contact between the optical lens and the film by a vertical ascending translational movement imposed on the piston supporting said lens by means of the lens carrier
  propagating and establishment conformal contact between said lens and said film by the application of a pressure P2 (or reaching a position threshold Z2) on the lens and/or on the film.

The pressure P1 or the position threshold Z1 makes it possible to conform the film. The pressure P2 or the position threshold Z2 makes it possible to ensure optimum assembly between the film and the optical lens.

Thus in the case where the apparatus, in its first variant, comprises a module equipped with a mechanical piston, the initiation of the conformal contact between the film and the optical lens is obtained by activating the electrical or pneumatic means integrated with the piston; the propagation of the conformal contact is obtained by maintaining the force exerted on the piston, permitting is ascending vertical translational movement and concomitantly maintaining the pressure P1 exerted by the stamp on the film. At the end of the pressure applied between the film and the lens is a target pressure P2, resulting from the pressure P1 maintaining the stamp in its position of descent and from the force exerted by the piston on the lens.

In the case where the apparatus, in the second variant, comprises a module comprising a vacuum device, the initiation of the conformal contact between the optical lens and the film is obtained by the creation of a vacuum in the vacuum chamber; this vacuum involving an ascending vertical translational movement of the plate carrying the lens carrier and the lens; the propagation of the conformal contact between said lens and said film is obtained by application of a pressure P2 due to a descending vertical translational movement of the stamp on the film—lens assembly.

The implementation of these three steps by means of the apparatus according to the invention thus makes it possible to mold, transfer or to adhere a functionalized flexible flat film on a pseudo-spherical optical lens. Implementation of the apparatus according to the invention in a process of molding, transfer or adhering makes it possible to obtain a functionalized optical lens. Said functionality may be an optical, structural, physical or physiochemical property. The functionality thus applied to the optical lens represents properties most approximating its initial properties without common deformations. The processes of molding, transfer and of adhering a functionalized flexible planar film on an optical lens by means of an apparatus of the type described above is an integral part of the invention. These three steps made possible by virtue of the means implemented in the apparatus, both in its first variant and in its second variant embodiments, make it possible to control the deformation induces in the film due to its stretching in order to adapt a planar geometry to a pseudo-spherical geometry. The control of the deformation is an important parameter in the context of the invention, namely in the case where the support of the film is an ophthalmic lens, because these may induce variations of optical properties of the final object and/or of cosmetic affects.

The apparatus according to the invention makes it possible to realize the conformation of the film at ambient temperature, an advantage that cannot be ignored in terms of economics. Furthermore, this makes it possible to envisage working with films having a functionality that is sensitive to heat or to radiation. For a given film, its conformation at ambient temperature is all the more applicable when the radius of curvature of the optical lens to which the film must be applied is large (that is, preferably greater than 100 millimeters). The person skilled in the art will also understand that the conformation of the film at ambient temperature is much easier to implement when the film has greater flexibility.

The second interest is that the preforming of the film by the stamp, making it possible to consequently guarantee a conformal contact between the optical lens and said film, is done in situ in a single unit. Preforming of the film makes it possible to initiate the contact between the film (30) and the optical lens (20) by the center of the film. This central contact ensures a radial diffusion of conformal contact starting from the center of the film as well as sending a significant portion of the deformation of the film to the periphery of the film. The utilization of a stamp connected to a position sensor makes it possible also to control the height of initiation of contact between the film and the optical lens.

The utilization of a module comprising vacuum means is particularly interesting, because the vacuum that exists in the vacuum chamber at the time of contact of the film and the lens makes it possible to eliminate air bubbles that can form between the lens and the film, include in a liquid layer of coating or adhesive substance deposited earlier. These bubbles cause the presence of defects in the contact between the film and the lens and consequently cosmetic and functional defects in the functionalized optical lens. In the case where the optical lens is an ophthalmic lens the presence of such defects is not acceptable, because they would be capable of causing visual annoyance for the wearer. Thus, it may be advantageous in the context of the invention to combine the vacuum means present in the second embodiment of the conforming apparatus with the module used in the first embodiment. In this variant combining a module having a piston that enabling it alone to effect vertical translational movements of the lens carrier and thus of the lens and vacuum means, it is possible to obtain an apparatus in which the process of implementation makes it possible to eliminate any air bubbles that may occur at the film/optical lens interface. In such a combination, the changing of pressure created in the module is used only for the second function; that is, to eliminate the remaining air bubbles at the film/lens interface.

The mechanical anti-return device (6) of the piston (2) capable of blocking the plate (3), that is, capable of preventing a descending vertical translational movement, ensures maintaining the position of said plate when the stamp (11) applies a pressure on the film/lens assembly up to the pressure threshold P2 in order to establish the conformal contact between the film and the lens.

The force sensor (14) situated at the translation means (12) measures the force exerted by the stamp on the film, then on the film/lens assembly, and transmits the information to the automatic device (15). The force sensors thus makes it possible to control the position of the stamp along the axis (y); that is, at the height relative to its starting point and thus the height at which the film/lens contact is initiated and then propagates at the same time that the conformation is done. In another embodiment of the invention, the force sensor that measures the pressure P1 can be optionally replaced by one or a plurality of position sensor(s) that measure the position threshold Z1, or can be combined with one or a plurality of position sensor(s).

The translation means (12) can be electrical, pneumatic or mechanical and are chosen from between a lift cylinder and an electrical motor. Preferably the means of translation (12) comprising an electrical stepping motor which makes possible final control of the mechanical pressure or of the position thresholds applied to the stamp (11) and the displacement rates of the rod (13) supporting said stamp.

The shape, size, nature and hardness of the stamp (11) are chosen as a function of the pseudo-spherical profile of the optical lens to be processed and of all of the parameters of utility in characterizing said pseudo-spherical surface. The four parameters relative to the stamp make it possible to defined the support surface for the film/lens contact. In one embodiment of the invention, the stamp may be hollow in its center in order to provide it with greater deformability and thus better contact with the entirety of the film. A stamp comprised of layers of materials of different harnesses or of an assembly if materials of different harnesses can also be used. The hardness of the material or materials comprising the stamp is between 30 and 75 Shore 00, preferably between 39 and 64 Shore 00.

In the context of the invention, a pseudo-spherical surface is defined as a continuous concave or convex surface, that is, a surface devoid of holes or tracks. In general, at least on of the two faces of an optical lens is pseudo-spherical such that the variation in thickness of the lens resulting therefrom confers on it its optical power. Afocal, unifocal, bifocal, trifocal and progressive ophthalmic lenses all have at least one pseudo-spherical face. A spherical surface corresponds to a particular instance of pseudo-spherical surface for which the radii of curvature of the surface in two perpendicular directions are equal. Consequently, the expression "pseudo-spherical" is understood to include the special case of spherical surfaces.

The automatic device (15) makes it possible to manage and control the determinant parameters for ensuring a conformal contact between the film (30) and the lens (20). This automatic device is the same regardless of which apparatus is being utilized. It is calibrated as a function of the specific parameters that must be controlled in a process of utilization of said conforming apparatus. These parameters are namely the following:

The pressure threshold P1 exerted on the stamp (11) which is between 1 N and 200 N (Newton), preferably between 20 N and 100 N; this pressure threshold may be replaced by a position threshold Z1 when the means of control used is a position sensor in lieu of a force sensor. This pressure threshold expresses the optimum pressure that must be exerted on the film by the stamp, in order to obtain adapted preforming of the film as a function of the pseudo-spherical profile of the optical lens. P1 (or Z1) is a parameter that is common to the conforming apparatus regardless of its means of utilization;

The vacuum imposed in the vacuum chamber (4) of the module (1), the measure of the residual pressure being in the range between 30 and 800 millibar (mbar), preferably between 50 and 600 mbar. These values are characteristics of a conforming apparatus according to the invention comprising vacuum means whose primary function is to control the ascending translational movement of the piston supporting the lens-carrier;

The temporization $t_1$, that commences from the application of vacuum in the vacuum chamber of the module and which extends up to the moment of application of the pressure threshold P2; this temporization $t_1$ is between 0 and 20 seconds, preferably between 1 and 8 seconds;

The speed V0 of ascending vertical translation along the axis (y) of the mechanical piston (2) supporting the lens carrier and the lens, which is between 0.5 and 100 mm/s., preferably between 1 and 20 mm/s.;

The speed V1 of descending vertical translation along the axis (y) of the stamp (11), which is between 0.5 and 50 mm/s (millimeters per second), preferably between 1 and 20 mm/s;

The pressure threshold P2 that represents the target assembly pressure for ultimately obtaining a conformal contact of the film on the entirety of the surface of the optical lens to be processed. This threshold is between 20 and 800 N, preferably between 50 and 300 N. This threshold may be substituted by a position threshold Z2 when the means of control used in the piston is a position sensor in lieu of a pressure sensor;

The temporization $t_2$ during which the pressure target P2 (or position target Z2) is maintained over the entire film/optical lens, which is between 0 and 120 seconds, preferably between 1 and 10 seconds;

The speed V2 of ascending vertical translation along the axis (y) of the stamp (11) after conformal contact with the optical lens (20) and the film (30), which is between 0.5 and 50 mm/s (millimeters per second), preferably between 1 and 20 mm/s.

These pressure thresholds P1 and P2 as well as the vacuum and the mechanical movement of translation of the piston in the module may be exerted, if desired, in dynamic fashion.

Thus the apparatus according to the invention makes it possible, if one wishes to successively treat the two faces of the same lens, by simple changing of the stamp and rotating the optical lens on the lens carrier, once one of the faces of said lens is treated.

The conforming apparatus according to the invention may, in addition, comprise a thermal or ultraviolet radiation polymerization unit (100) that makes it possible to polymerize a coating that can be molded or an adhesive substance that can be polymerized by the application of heat or ultraviolet radiation. The coating or the adhesive substance is first applied on the surface of the optical lens (20) before being placed in conformal contact with the film (30) and/or on the internal face of the film; that is, the face of the film that must be placed in conformal contact with said optical lens. Depending on the liquid, gel, solid, or film nature of the coating or of the adhesive substance, it may be deposited on the optical lens and/or on the film in the form of drop(s) or layers(s) using conventional application methods well-known to the specialist in the art such as dip coating, spin coating, spray coating or direct deposition, for example. The polymerization phase of the coating or of the adhesive substance is done after the establishment of conformal contact between said lens and said film; that is, after temporization t2. The step is done after releasing the contact between the stamp and the film/lens formation by horizontal translation (along the x axis) of the module (1) towards the polymerization unit (100) by operating the mechanical means situated on the adapter base (10) carrying said module (1). For this mode of implementation of the invention the conforming apparatus comprising a module equipped with vacuum means is used advantageously. Thus, up to the end of the polymerization cycle, the conformal contact between the optical lens and the film remains optimal by virtue of maintaining a constant vacuum in the vacuum chamber of the module.

In this application, the utilization of a module thus makes it possible to obtain an intimate assembly of the optical lens and the film by means of a temporary holding device (vacuum in the module and blocking the piston by the anti-return device), the polymerization operation making said assembly permanent in the case of adhesion of a functionalized film using an adhesive substance. In the case of the transfer or molding of a functionality carried by the film, the assembly will be interrupted as the result of the polymerization operation.

The implementation of a conforming apparatus comprising such a polymerization step also makes it possible to improve the quality of realization of a functionalized optical lens. In fact, it is well known that the adhesive substances such as the coatings or the glues capable of polymerizing when exposed to UV radiation are sensitive to oxygen which involves an inhibition of the polymerization by the chain reactions of photo-oxidation. The utilization of a module makes it possible to work at low residual oxygen rates in the vacuum chamber containing the lens, making it possible to limit or even to eliminate this problem of inhibition of polymerization.

In the case of thermal polymerization of a coating or of an adhesive substance containing a solvent, a more uniform polymerization is observed also because of better controlled evaporation of the solvent under the effect of the vacuum means continuously connected to said module.

The conforming apparatus according to the invention may also comprise a removable convection and/or radiation heating unit (200) for the film (30); said unit being piloted by an automatic device capable of controlling the temperature and the distance applied between the film and the heating unit. This removable heating unit (200) can be associated with the conforming apparatus alone or with the conforming apparatus associated with a polymerization unit (100).

In this embodiment, the heating unit makes it possible to heat the functionalized flexible planar film in order to modify its intrinsic mechanical properties and to make said film more amenable to deformation. As a function of the requirements, the heating unit is either temporary and is used only prior to preforming of the film or permanent, that is, it is present from the step of preforming of the film through to the step of establishment of the conformal contact between the lens and the film. This configuration of the apparatus is particularly interesting in the case where the film is a thermoplastic film susceptible to being thermoformed. The modes of heating by irradiation or convection well known the person skilled in the art making optimum thermoforming of the film possible can be used in the context of the invention.

The invention thus comprises an apparatus for conforming a functionalized flexible planar film onto a curved surface, said apparatus having either an embodiment in which the vertical translational movement of the lens is realized under the action of a mechanical piston or an embodiment in which said translational movement is realized under the action of a vacuum, each of said embodiments being optionally capable of being combined with a polymerization unit and/or a thermal unit.

Figure 3:
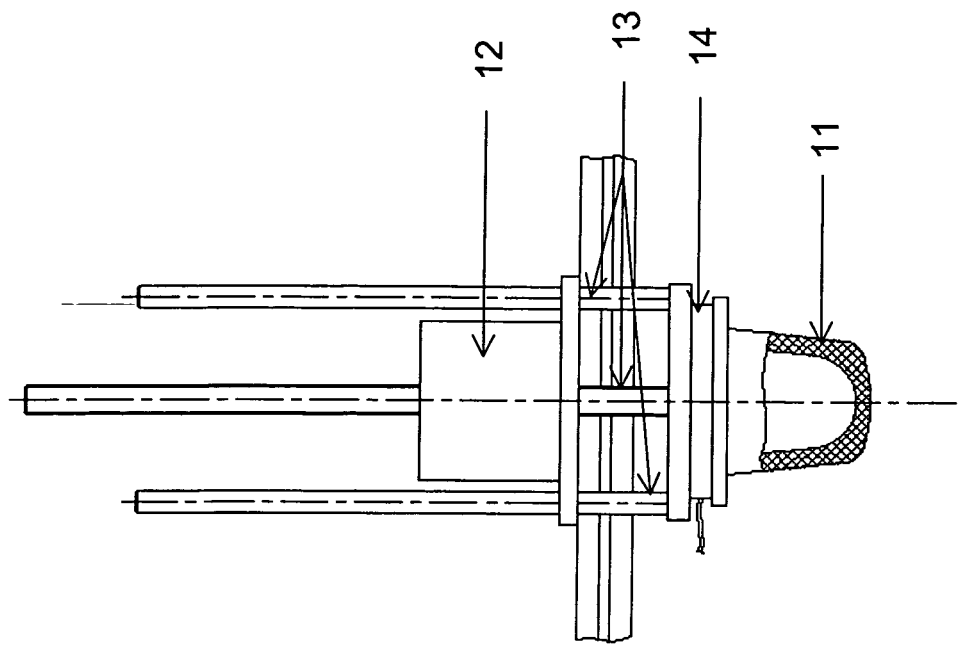
Figure 2:
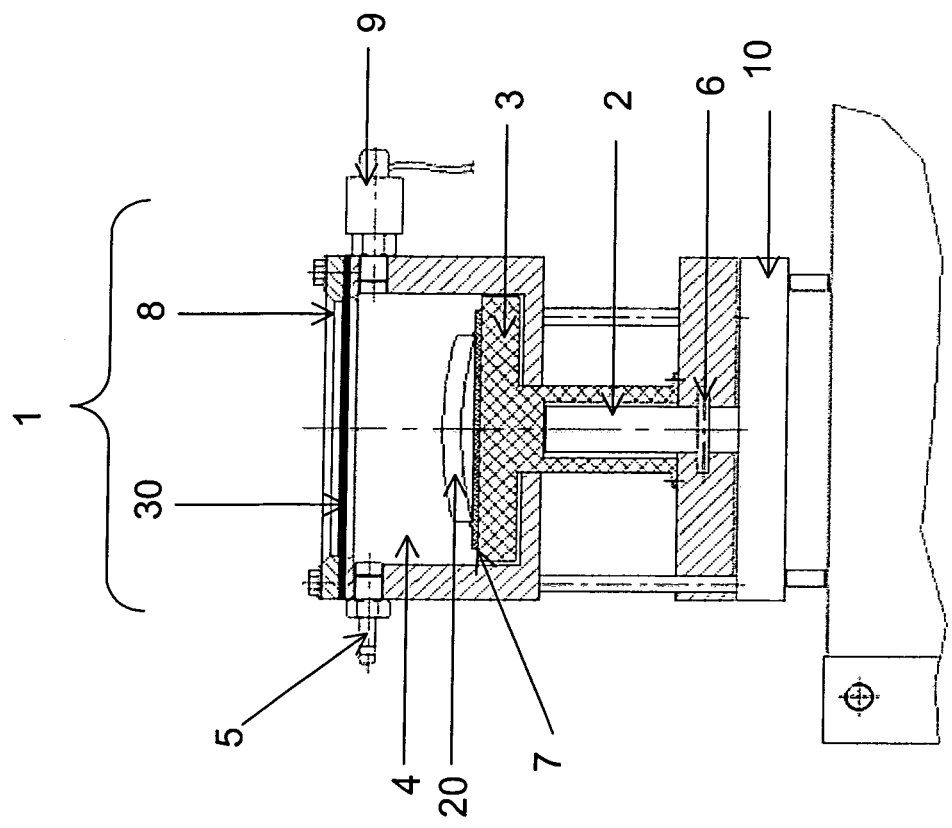

Other particular features and advantages of the present invention will become more apparent in the following description of non-limiting exemplary embodiments with reference to the attached drawings, wherein:

FIG. 1: represents an apparatus for conforming a functionalized flexible planar film according to one embodiment having a module comprising a vacuum device;

FIG. 2: represents a detail of the conforming apparatus: module (1) of the conforming apparatus equipped with a vacuum device;

FIG. 3: represents a detail of the conforming apparatus: stamp (11) hollowed at its center and support;

FIG. 4a: represents a configuration of the conforming apparatus after application of the pressure threshold P1 to the stamp (11) and the vacuum in the vacuum chamber (4): initiation of the conformal contact. In the case of the figure the contact is initiated at the geometric center of the lens by alignment under the control of the automatic device (15) of the geometric centers of the lens, the film, and the stamp;

FIG. 4b: configuration of the conforming apparatus after application of the pressure threshold P2 to the stamp (11); propagation and establishment of the conformal contact between the film (30) and the optical lens (20).

Figure 5:
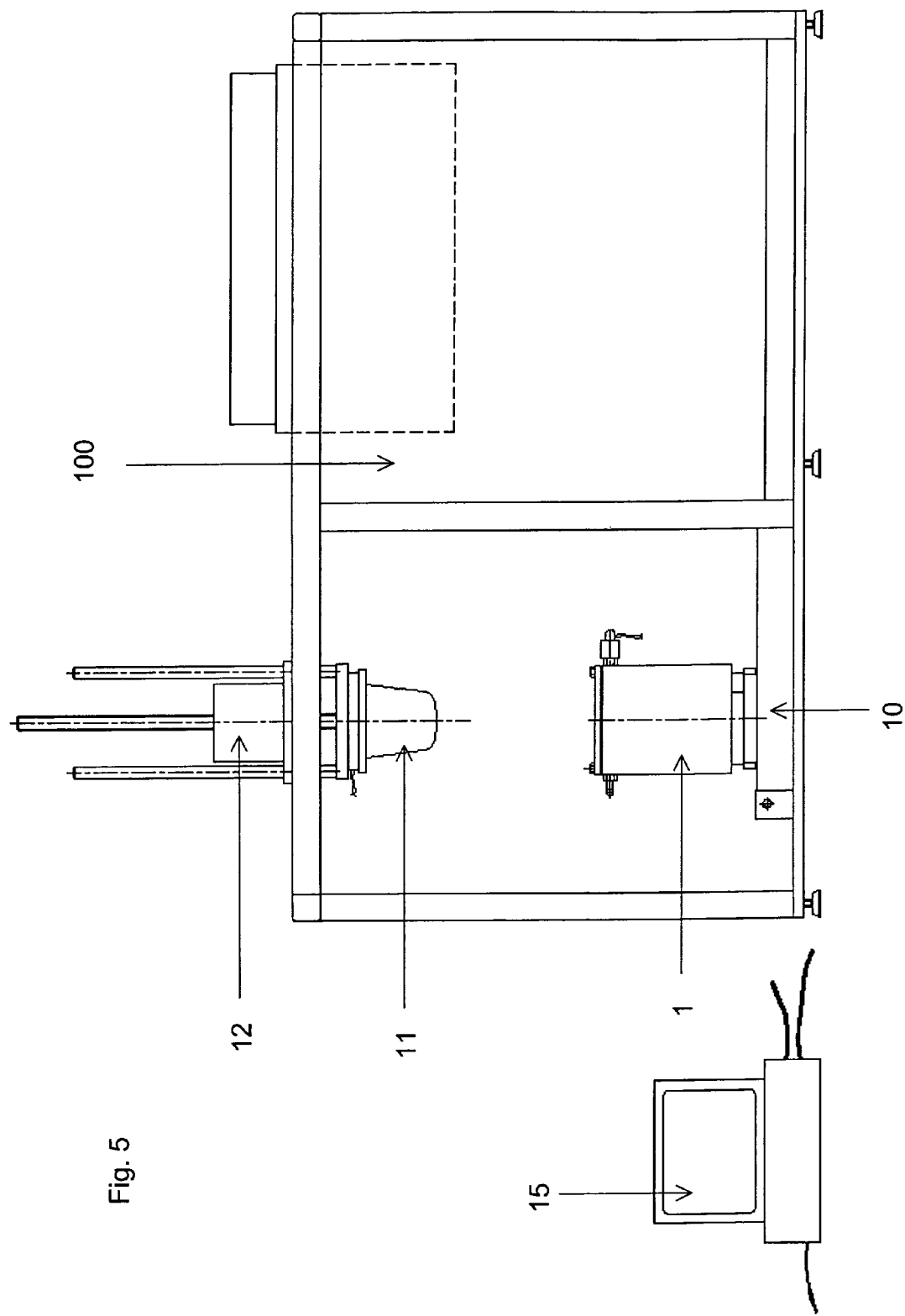

FIG. 5: Conforming apparatus combined with a polymerization unit (100).

Figure 6A:
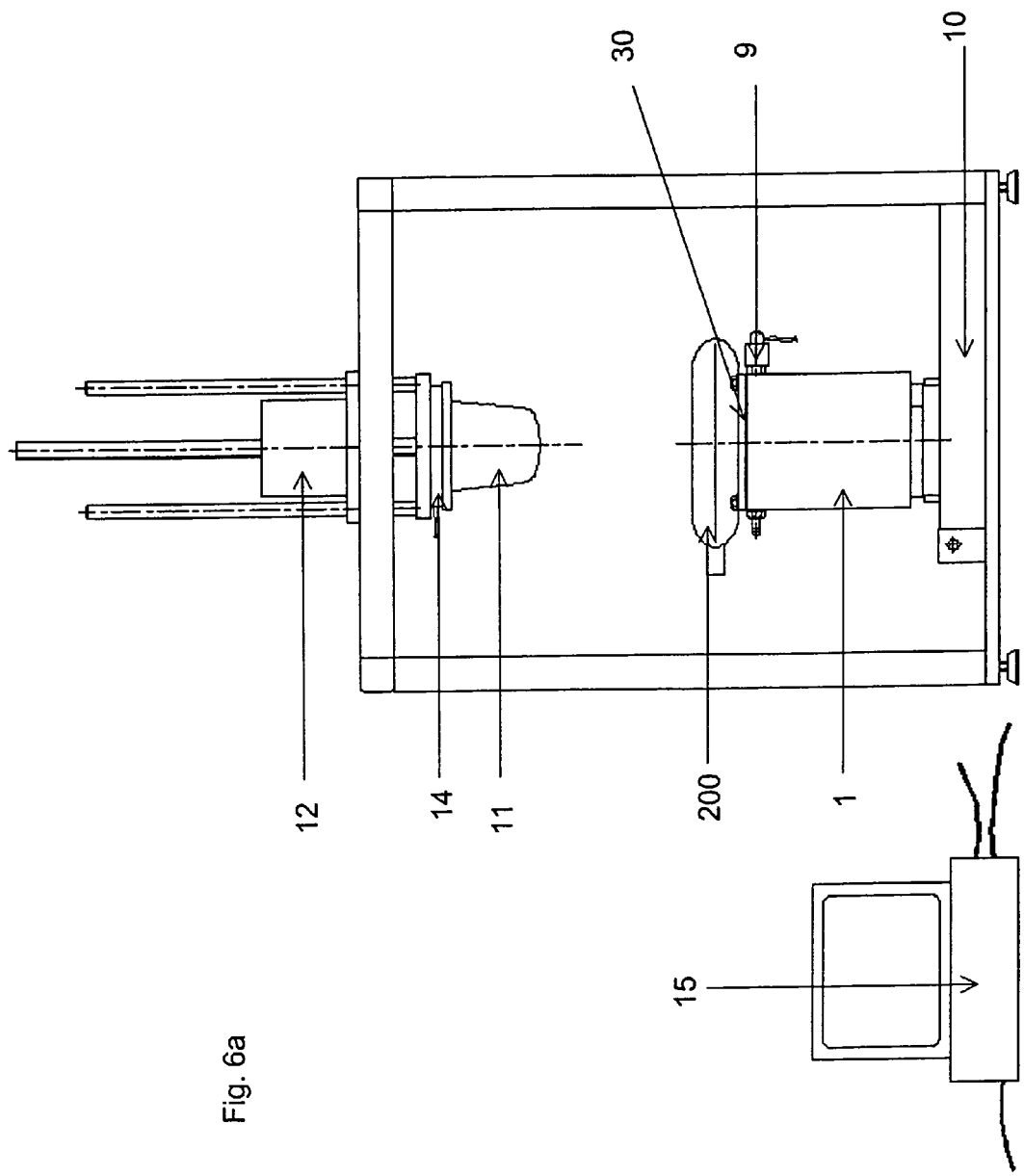
Figure 6B:
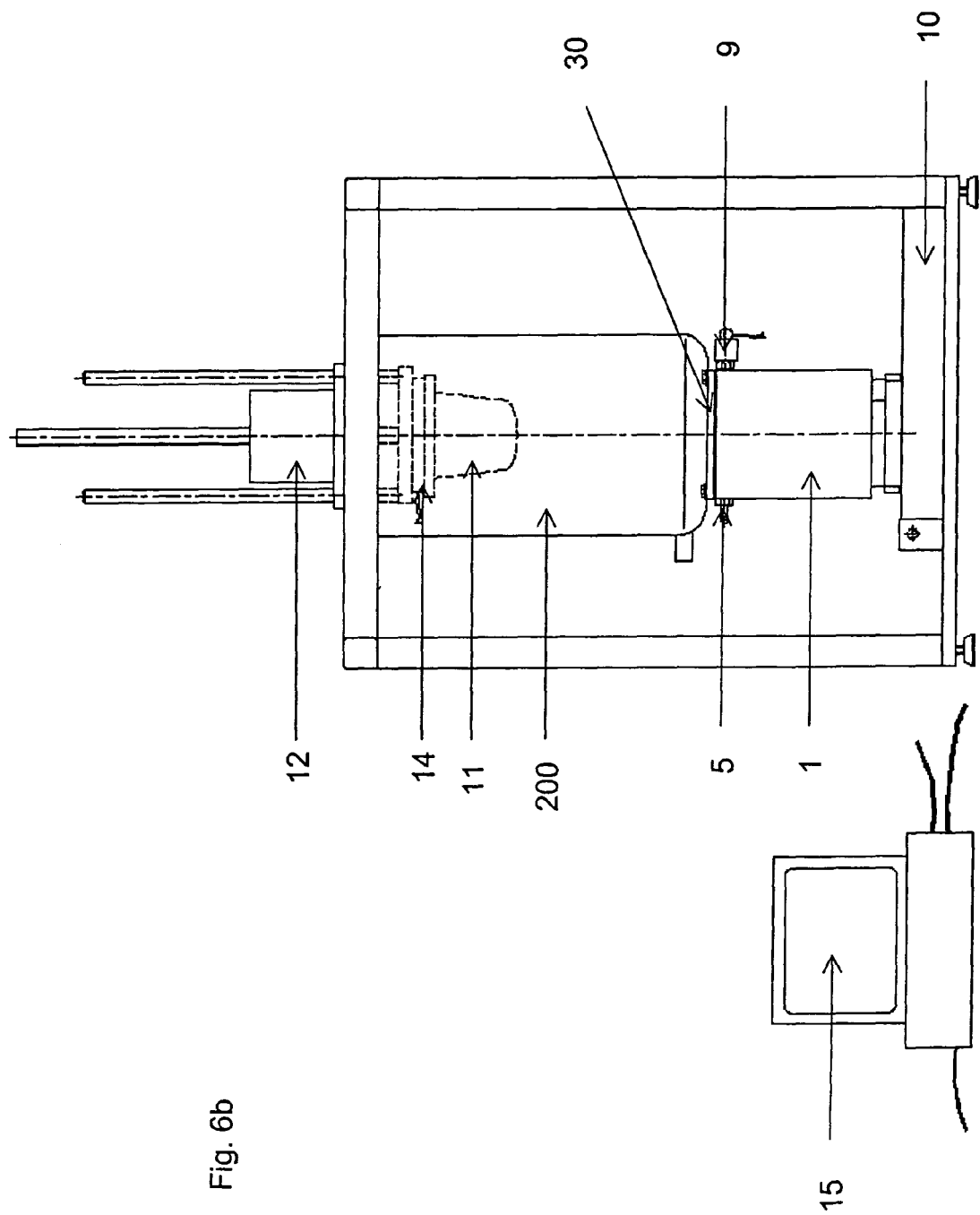

FIG. 6a: conforming apparatus comprising a removable heating unit (200); FIG. 6b: conforming apparatus comprising a removable heating unit (200) capable of encompassing the stamp (11).

The apparatus according to the invention may also be used in a process of functionalization of an optical lens. As a factor of the functionalization that one wishes to introduce into said optical lens and the nature of the functionalized flexible planar film used, this functionalization process can be a process of gluing, transfer, or molding process of a functionalized flexible planar film onto an optical lens. Implementation of each of these procedures makes it possible to glue, transfer, or mold, respectively, a functionality present on a flexible planar film on the face of an optical lens where one wishes to have said functionality.

In the case of gluing, said functionality can be situated on the inside face and/or the outside face of said film and/or in the thickness of the film. In the case of a transfer or molding, said functionality is situated on the inside face of the film.

The "inside face of the film" is defined, according to the invention, as the face of the film that after implementation of the procedure is in conformal contact with the face of the optical lens that is to be treated. The "face of the optical lens to be treated" is defined, according to the invention, as the pseudo-spherical profiled face, concave or convex, of an optical lens on which one wishes to introduce a functionality.

"Functionality" is defined, according to the invention, as a structural, optical, physical or physiochemical functionality. This type of functionality can be a function protecting against photodegradation or photo-oxidation, an anti-shock function, an anti-radiation function, an anti-reflection function, a polarizing function, a color filtration function, a photochromic function, an antistatic function, an anti-contamination function, a function applied by a pixel or microstructured architecture.

Thus, the apparatus according to the invention is useful for two main applications that include microstructuring, also called micromolding, and lamination which comprises gluing and transfer.

The optical lens is made of a material classically used in optics and opthalmology. By way of information but not limitation, the materials are chosen from among the polycarbonates; polyamides; polyimides; polysulfones; copolymers of polyethylene there phthalate and polycarbonate; polyolefins, namely polynorbomenes; polymers and copolymers of diethylene glycol bis(allylcarbonate); (meth)acrylic polymers and copolymers, namely (meth)acrylic polymers and copolymers derived from bisphenol-A; thio(meth)acrylic polymers and copolymers; urethane and thiourethane polymers and copolymers; epoxy polymers and copolymers; and episulfide polymers and copolymers.

"Optical lens", according to the invention, is defined namely as ophthalmic lenses and lenses for optical instruments; "ophthalmic lenses" are defined as lenses adapted namely for mounting in eyeglasses whose function is to protect the eye and/or to correct vision; these lenses are selected from the afocal, unifocal, bifocal, trifocal, and progressive lenses.

The film supporting the functionality is a plastic film chosen from among polyethylene terephthalate (PET), polyethylene naphthalate (PEN), polycarbonate (PC), polyether sulfone (PES), polyarylate (PAR), polyvinyl alcohol (PVA), the polycyclic olefins (PCO), polyamide (PA), polyurethane (PU), and polyimide (PI) without this list being limiting. This may be a simple unilayer or a laminated or stratified film comprising a plurality of layers having identical or different characteristics.

"Gluing" is defined as obtaining a permanent contact between the functionalized film and the surface of the optical lens to be treated, said permanent contact being obtained by the establishment of a conformal contact between said film and said lens, followed optionally by a polymerization step or a heating step, in order to finalize the adhesion and adherence between the two entities. At the end of this gluing process the assembled film and the optical lens form one single entity.

"Transfer" is defined as the integral transfer of the functionality; that is, of the material present on the inside fact of the film to the face of the optical lens to be treated; at the end of this transfer process, the film no longer has the functionality.

"Molding" is defined as the realization of the complementary imprint of the structural functionality initially present on the functionalized planar film onto the face to be treated of the lens; at the end of this process of molding, the film retains its structural functionality and may be used again for another cycle of the procedure.

"Adhesive substance" is defined as a substance capable of forming and preserving the adhesion between two surfaces. By way of information but not limitation, the following adhesive substances may be mentioned: epoxyde adhesives, reactive polyurethane adhesives, thermo-curing glues, latex, polymerizable monomer-based adhesives such as the cyanoacrylate adhesives, the structural acrylic or modified acrylic adhesives, "hot melt" or thermofusible adhesives, PVC (polyvinyl chloride) plastisols, elastomer adhesives, neoprene contact glue, vinylic emulsion and copolymer glues, pressure-sensitive adhesives (PSA), water glues.

The invention thus comprises a process for functionalization of an optical lens by means of a conforming apparatus, said procedure comprising the following steps:

a. contact with the stamp (11) and the planar film (30) under the action of the translation means (12) and preforming of said film by the application of a mechanical pressure up to a threshold P1 or a position threshold Z1 controlled by a force sensor and/or position sensor (14);

b. activation of the piston (2) in the module (1) involving an ascending vertical translational movement at a speed of V0 of the optical lens (20) up to initiation of the contact between the preformed film (30) and said lens;

c. maintenance of the ascending vertical translation of the optical lens (20) by the action of the piston (2) until attaining the target pressure threshold P2 or the position threshold Z2 controlled by the force sensor and/or the position sensor (14) involving the propagation and establishment of the conformal contact between the face of the lens to be treated and the film;

d. maintenance of the lens/film conformal contact during a temporization time $t_2$;

e. ascending vertical translation of the stamp (11) at a speed V2;

f. interruption of the pressure applied to the piston; and g. opening of the module.

The invention also comprises a procedure for functionalization of an optical lens by means of the conforming apparatus comprising a module equipped with vacuum means, said procedure comprising the following steps:

a. placing in contact of the stamp (11) and the planar film (30) under the action of translation means (12) and preforming of said film until attaining a mechanical pressure threshold P1 or position threshold Z1 controlled by the force sensor and/or the position sensor (14);

b. placing the module (1) under vacuum via the vacuum chamber (4) by means of the vacuum device (5) involving an ascending vertical translational movement of the piston (2) supporting the optical lens (20) until the initiation of the contact between the preformed film (30) and said lens, said contact being maintained during a temporization $t_1$;

c. blockage of the piston (2) by actuation of the anti-return device (6);

d. descending vertical translation of the stamp (11) at a speed V1 up to the target pressure threshold P2 (or position threshold Z2) controlled by the force sensor and/or the position sensor (14) involving the propagation and establishment of the conformal contact between the face of the lens to be treated and the film;

e. maintenance of the lens/film conformal contact during a temporization time $t_2$;

f. ascending vertical translation of the stamp (11) at a speed V2 and maintaining constant the vacuum applied in the vacuum chamber in order to maintain the conformal contact between the lens and the film;

g. interruption of the vacuum and opening of the module.

The threshold P1 or position threshold Z1 is defined by modeling as a function of the following parameters: geometry of the stamp, thermomechanical properties of the functionalized flexible planar film, thermomechanical properties of the stamp, pseudo-spherical profile of the face of the lens to be treated, this latter parameter can be reduced to the radius of curvature of the optical lens in the case of a spherical lens. Setting of the threshold P1 (or of the position threshold Z1) determines the deformation applied to the flexible planar film prior to contact with the optical lens. This preforming facilitates the escape of air and air bubbles between the face of the lens to be treated and the film. Utilization of the vacuum means connected to the module used in the first functionalization procedure described above can also play a beneficial role in facilitating the escape of residual air and air bubbles. This step of preforming the film is particularly important in the case where the pseudo-spherical surface to be treated of the lens presents a concave profile.

The target threshold of pressure P2 (or position threshold Z2) is modeled as a function of the thermomechanical characteristics of the stamp and of the functionalized flexible planar film as well as the pseudo-spherical profile of the face of the lens to be treated. The methods capable of modeling these systems are well known to the person skilled in the art. Setting of the target threshold P2 (or Z2) may be achieved either using the pressure exerted on the film via the stamp or using the pressure exerted concomitantly on the film and on the lens via the stamp and the piston, respectively. This ensures the contact of the film over the entire surface of the lens and consequently the quality of the functionalization of the optical lens.

The temporization $t_2$, that is, the period during which the stamp, the film, and the optical lens are in contact is also an important parameter in the process. This temporization is between 0 and 120 seconds, preferably between 1 and 10 seconds. This temporization is particularly important when the process of functionalization is a gluing process. It is thus adapted as a function of the adhesive substance used as has been stated above in the description part.

The speed of raising (V2) the stamp is chosen in order to avoid a rebound effect of the film at the moment of separation from the stamp. The separation can also be controlled by the anti-return device (6) that prevents any descending vertical translational movement of the plate (3) supporting the lens carrier (7) and the optical lens (20) as a well as by the force applied to the piston (2) holding said lens carrier (7).

As described hereinbefore, the apparatus according to the invention may additionally comprise a thermal or ultraviolet radiation polymerization unit (100). This type of device is particularly interesting for implementation when the functionalization process is a gluing process implementing an adhesive substance for which the adhesion and the adherence between the film and the optical lens are obtained following a thermal or UV polymerization of said adhesive substance.

The apparatus in the latter embodiment is also relevant for its implementation in a molding process using polymerizable coatings. Thus, after implementation of the functionalization process by molding, the complementary imprint of the film carrying the structural functionality is found inscribed on the coating previously deposited on the face of the lens to be treated. The polymerization in situ of the coating layer deposited on the face to be treated of the lens results in obtaining a microstructurally polymerized coating and in the end to an optical lens having a microstructured functionality. This microstructured functionality can be an anti-reflection function, in particular. For the implementation of this process one advantageously uses a conforming apparatus according to the second variant; that is, an apparatus in which the translational movements of the lens are under the control of vacuum means. These means, by virtue of the vacuum that they produce in the module via the vacuum chamber, make it possible to maintain the non-permanent contact established between the film and the lens after release of the stamp, the permanent contact being obtained in a polymerization step in the polymerization unit of the substance present between the film and said lens.

Thus, the functionalization process according to the invention represents a process of molding of a functionalized flexible planar film on an optical lens by means of the apparatus according to the aforegoing description that includes the following steps:

a) positioning of the lens (20) on the lens carrier (7) on the inside of the module (1), said lens comprising a coating capable of being molded on its face to be treated;

b) positioning of a flexible planar film (30) comprising a structural and/or geometric functionality in the film carrier (8), said functionality being situated on the inside face of the film;

c) positioning of the film carrier (8) on the upper end (1a) of the module (1) and closure of said module;

d) positioning of the module (1) vertically above the stamp (11) with alignment of their respective geometric centers under the control of mechanical means contained in the adaptor connection (10) of said module (1);

e) establishment of the conformal contact between the face of the lens to be treated (20) and the film (30) by attaining the target pressure P2 (or the position threshold Z2);

f) release of the stamp (11) from the film/lens entity;

g) opening of the module;

h) disassembly of the film and the optical lens, said lens comprising a geometric or structural functionality imprinted of that present on the functionalized flexible planar film using in step (a).

The establishment of the conformal contact described in step e) of the process of molding is done according to steps a) to d) of the functionalization process described previously, in the case where a conforming apparatus is used in which the movement of the piston is under mechanical control or according to steps a) to e) of the functionalization process described previously, in the case where a conforming apparatus is used in which the movement of the piston is under the control of a vacuum created in the module by means of the vacuum device.

For the implementation of such a molding process in which the optical lens comprises a coating capable of being molded such as a polymerizable coating under ultraviolet irradiation or thermal treatment, the conforming apparatus used is preferably that according to the invention and comprising a vacuum device and, preferably, such an apparatus combined with a polymerization unit (100).

In this latter case the steps of the process are those previously described but comprising in addition a step f1) following step f) such that:

f1) horizontal translation of the module towards the polymerization unit (100), the conformal contact between the optical lens and the film being maintained until the end of the polymerization step by maintaining a constant vacuum in the vacuum chamber of the module.

According to a second variant of the invention, the functionalization process represents a process of transferring a functionalized flexible planar film onto an optical lens by means of the apparatus as described previously and comprising the following steps:

a) positioning of the lens (20) on the lens carrier (7) on the inside of the module (1);

b) positioning of a flexible planar film (30) comprising a structural, geometric, optical, physical and/or physiochemical functionality in the film carrier (8), said functionality being situated on the inside face of the film;

c) positioning of the film carrier (8) on the upper end (1a) of the module (1) and closure of said module;

d) positioning of the module (1) vertically above the stamp (11) with alignment of their respective geometric centers under the control of mechanical means contained in the adaptor connection (10) of said module (1);

e) establishment of the conformal contact between the face of the lens to be treated (20) and the film (30) by attaining the target pressure P2 (or the position threshold Z2);

f) release of the stamp (11) from the film/lens entity;

g) opening of the module;

h) peeling the film on the surface of the optical lens, said lens comprising the entirety of the geometric, structural, optical, physical and/or physiochemical functionality present on the functionalized flexible planar film used in step a).

The establishment of the conformal contact described in step e) of the process of molding is done according to steps a) to d) of the functionalization process described previously, in the case where a conforming apparatus is used in which the movement of the piston is under mechanical control or according to steps a) to e) of the functionalization process described previously, in the case where an conforming apparatus is used in which the movement of the piston is under the control of a vacuum created in the module by means of the vacuum device.

According to a third variant, the invention comprises a process of functionalization by gluing a functionalized flexible planar film onto a lens by utilizing an apparatus as described in the first variant, said process comprising the following steps:

a) deposition of the adhesive substance on the inside face of the film (30) and/or on the face to be treated of the optical lens (20);

b) positioning of the lens (20) on the lens carrier (7) on the inside of the module (1);

c) positioning of the flexible planar film (30) comprising the structural, optical, physical, and/or physiochemical functionality in the film carrier (8), said functionality being situated on the inside face of the film and/or the outside face of the film and/or in the thickness of the film;

d) positioning of the film carrier (8) on the upper end (1a) of the module (1) and closure of said module;

e) positioning of the module (1) vertically above the stamp (11) under the control of the mechanical means contained in the adapter base (10) of said module (1);

f) establishment of the conformal contact between the face of the lens to be treated (20) and the film (30) by attaining the target pressure P2 (or the position threshold Z2);

g) release of the stamp (11) from the film/lens entity;

h) opening of the module;

The establishment of the conformal contact described in step f) of the process of molding is done according to steps a) to d) of the functionalization process described previously, in the case where a conforming apparatus is used in which the movement of the piston is under mechanical control or according to steps a) to e) of the functionalization process described previously, in the case where a conforming apparatus is used in which the movement of the piston is under the control of a vacuum created in the module by means of the vacuum device.

In the context of a gluing process of a functionality onto an optic lens, the conforming apparatus according to the invention for implementation of this process will be chosen as a factor of the adhesive substance used.

Thus in the case where the adhesive substance is a thermally polymerizable adhesive of an adhesive that polymerizes under the effect of ultraviolet irradiation, the apparatus to be used for the gluing process will comprise at least one polymerization unit (100). In this embodiment, the gluing process comprises all of the steps previously described with step a) the deposition of an adhesive substance that is polymerizable by the effects of UV irradiation or heat, and a supplementary step f1) as previously described, after step g). Preferably in this case a conforming apparatus is used that comprises a piston whose translational movement is under the control of a vacuum device, in order to maintain the temporary contact between the film/the adhesive/the lens after release from the stamp. In the scope of this utilization it is understood that the vacuum in the module is maintained up to the end of the cycle of polymerization of the adhesive substance, which ensures that a permanent contact between the lens and the film is obtained.

In the case where the adhesive substance is a fusible (hot-melt) adhesive, the apparatus used will comprise at least on removable heating unit (200).

In the case where the adhesive substance is a pressure-sensitive adhesive (PSA), the conforming apparatus comprising a piston whose translational movement is under the control of mechanical means may be adequate. In this latter case, one aims for maintaining a conformal contact between the film and the optical lens during a temporization $t_2$ that is controlled as a function of the chemical nature of the PSA used. With this type of adhesive substance the permanent contact is obtained immediately and the implementation of the vacuum means ultimately making possible a contact between the film and the lens after release of the stamp is no longer necessary.

According to the invention, the utilization of a pressure-sensitive adhesive material or PSA (pressure-sensitive adhesive) is particularly advantageous because it facilitates economical application of the film onto the surface of the basic optical element while preserving the dioptric properties of the optical element.

In fact, all of the PSA have the common property of permanent adhesiveness (called "tack" or "tackiness") and a low modulus of elasticity at ambient temperature, typically between $10^3$ and $10^7$ Pa (Pascals). It is noteworthy that the mechanism of adhesion involved in this type of adhesive material does not involve chemical bonding but exploits the particular viscoelastic properties of the PSA material. These properties that are intrinsic to each PSA formulation make it possible to establish Van der Waals electrostatic interactions at the interface of adhesion. This is what is produced when the PSA is placed in contact with a solid material with the application of pressure—the pressure applied and the low modulus of the PSA material make it possible to ensure an intimate contact of the PSA at the molecular level with the topology of the material to be glued. On the other hand, the volumic viscoelastic properties of the PSA make it possible to dissipate into the thickness of the adhesive layer the energy brought about by the mechanical stresses of the adhesion interface and thus to resist the mechanisms of detachment.

Furthermore, the possibility of depositing a PSA adhesive material in the form of a fine layer of uniform thickness whose thickness is between 0.5 micron and 300 microns makes it possible to avoid altering the nominal power of the optical lens regardless of the spatial zone concerned. In this fashion, the adhesion of the functional film is compatible with the precision that is necessary when the lens is a progressive ophthalmic lens.

Several pressure-sensitive adhesive materials may be used. Advantageously, the pressure-sensitive adhesive material that is used is chosen from the group comprising a polyacrylate base, a styrene based copolymer, and a mixture comprising a natural rubber. More particularly, the following may be mentioned by way of non-limiting example: the PSAs having a general composition based on polyacrylates, polymethacrylates; ethylenic copolymer based such as the ethylene vinyl acetates, ethylene ethyl acrylates, ethylene ethyl methacrylates; the PSAs having a base of synthetic rubber and elastomers, including the silicones, the polyurethanes, the butadiene styrenes, the polybutadienes, the polyisoprenes, the polypropylenes, the polyisobutylenes; the PSAs based on polymers comprising the nitrites or acrylonitriles; the PSAs based on polychloroprene; the PSAs based on block copolymers comprising polystyrene, polyethylene, polypropylene, polyisoprene, polybutadiene; the PSAs base on polyvinylpyrrolidone and vinylpyrrolidone copolymers as well as the compositions or mixtures (of continuous or discontinuous phases) of the aforegoing, as well as the block copolymers obtained using the aforegoing. These PSAs can also include in their formulation one or a plurality of additives chosen particularly from among the tackifiers, the plastifiers, the bonders, the antioxidants, the stabilizers, the pigments, the colorants, the dispersing agents, and the diffusers. Preferably in the context of the invention a polyacrylate—based PSA is used.

A final object of the invention is a functionalized optical lens, said functionalization being obtained by the functionalization process described hereinbefore by utilizing an apparatus for conforming a functionalized flexible planar film according to one of the embodiments of the invention. More particularly, the functionalized optical lens is obtained by a process for gluing, transfer, or molding a functionalized flexible planar film as described hereinbefore onto an optical lens by using a conforming apparatus. Preferably the optical lens is an afocal, unifocal, bifocal, trifocal, or progressive ophthalmic lens. The functionalization is advantageously chosen from a layer providing protection against UV radiation, a layer providing an oxygen barrier, an anti-abrasion layer, a shock-absorbing layer, a polarizing coating, a colored coating, a photochromic coating, an anti-reflection coating, an anti-static coating, and a dirt-repellent coating.

EXAMPLES

For all of these examples, the measure of residual pressure after placement on vacuum is about 500 mbar and the force applied by the stamp varies between 10 and 200 Newton (1 to 20 kg), depending on the curvature of the lens and the nature of the film used. The lamp used for ultraviolet irradiation is a model HPV 100 (Hönle UV—Germany) equipped with a 100 W/cm mercury H bulb.

The stamps are silicone tampography stamps (Teca Print—France) with Shore 00 hardness graded between 38 and 54, or 2 and 8 shore A. The Shore 00 harnesses are designated according to the ASTM D 2240-04 standard.

Example 1

Realization of an Anti-Reflective Microstructure on the Convex Face of an Ophthalmic Lens by Cold "Uv Embossing (Molding)" Using a Commercial Film—Implementation of an Apparatus Comprising a Module Equipped with a Vacuum Device Capable of Controlling the Translation of the Piston A layer having a thickness of 3 µm of a commercial acrylic coating (SHC 3100—LTI) is deposited by spin coating on the convex face of a lens having a radius of curvature of 120 mm and a diameter of 65 mm.

The optical lens (20) is placed on the lens carrier (7) in the module (1) with its convex face upwards. The module is sealed by the flexible planar film (30) held in the film carrier (8). The flexible film is a PET film (polyethylene terephthalate) functionalized on its inside face using a microstructured coating. This film was realized by embossing. The total thickness of this film (PET+microstructured coating (functionalization)) is 100 µm.

The stamp (11) is made of silicon in an ovoid shape and hollowed out (radius of curvature approx. 43 mm on its lower part and a hardness of 38 Shore 00) pre-deforms the flexible planar film up to a pressure threshold P1 set at 20 N. The speed of descent of the stamp is set at 14 mm/sec. Once the threshold P1 is reached the vacuum is engaged in the vacuum chamber (4) of the module (0.5 bar vacuum). Consequently, the piston in an ascending vertical translational movement (along the y axis) raises the lens in order to initiate the contact between the lens and the film. A temporization $t_1$ of 5 seconds is carried out.

The stamp impacts upon the film/coating/lens assembly in such a manner as to propagate the conformal contact until a pressure threshold P2, set to 130 N, is attained. The speed of descent V1 of the stamp is set at 14 mm/sec.

Once the threshold P2 is attained, the stamp rises again at a speed V2 of 14 mm/sec. The temporization $t_2$ is 1 second. The different pressure, speed and temporization parameters are controlled and managed by a programmed sequence recorded in an automatic device (15).

The module is displaced by the implementation of mechanical translation means situated in the adaptor connector (10) towards a polymerization unit (100) comprising a commercial Hönle HPV 100 UV lamp equipped with an H bulb. The UVB (280 to 320 nm) radiance is 46 mW/cm$^2$. The polymerization of the coating is done over 1 min. 30 sec., or a UV polymerization dose of the coating of 4140 mJ/cm$^2$.

The module returns to its initial position and the vacuum is interrupted in the module. The film is disassembled from the optical lens.

The coefficient of reflection (Rv %) measured on the optical lens is 1.5%, uniform over the entire lens. The coefficient of diffusion is 0.2%.

Example 2

Realization of an Anti-Reflecting Microstructure on the Concave Face of an Ophthalmic Lens by Cold "UV Embossing (Molding)" Using a PDMS Microstructured Replica. Implementation of an Apparatus Comprising a Module Equipped with a Vacuum Device Capable of Controlling the Translation of the Piston A layer having a thickness of 3 µm of a commercial acrylic coating (SHC 3100—LTI) is deposited by spin coating on the concave face of a lens having a radius of curvature of 81 mm and a diameter of 65 mm.

The optical lens is placed on the lens carrier in the module with its concave face upwards. The module is sealed by the flexible planar film held in the film carrier. The flexible film is a PDMS film microstructured on its inside face, UV (Sygard 184—Dow Corning) and has a thickness of 2 mm. This film has a hardness of 50 Shore A and has a coefficient of stretch to breakage of 140%. This film is obtained by replication by molding of a microstructured master made of nickel.

The ovoid silicone stamp (having a radius of curvature of approx. 35 mm and a Shore A hardness 8) pre-deforms the flexible planar film up to a pressure threshold P1 set at 50 N. The speed of descent of the stamp is set to 14 mm/sec. Once the threshold P1 is reached the vacuum is engaged in the vacuum chamber of the module (0.5 bar vacuum). Consequently, the piston engages an ascending vertical translational movement allowing initiation of the contact between the optical lens and the film. A temporization $t_1$ of 5 seconds is carried out.

The stamp impacts upon the film/coating/lens assembly in such a manner as to propagate the conformal contact until a pressure threshold P2, set to 100 N N, is attained. The speed V1 of descent of the stamp is set to 1 mm/second.

Once the threshold P2 is attained, the stamp rises again at a speed V2 of 7 mm/sec. The temporization $t_2$ is 1 second. The different pressure, speed and temporization parameters are controlled and managed by a programmed sequence recorded in an automatic device (15).

The module is moved towards the polymerization unit by implementation of the mechanical means situated in the adapter base. The polymerization unit comprises a commercial Hönle HPV 100 UV lamp equipped with an H bulb. The UVB (280 to 320 nm) radiance is 46 mW/cm². The polymerization of the coating is done over 1 min. 30 sec., or a UV polymerization dose of the coating of 4140 mJ/cm².

The module returns to its initial position and the vacuum is interrupted in the module. The film is disassembled from the optical lens.

The coefficient of reflection (Rv %) measured on the optical lens is 2%. The coefficient of diffusion is 0.2%.

Example 3

Adhesion of a Film on the Convex Face of an Optical Lens with Thermal Assistance—Implementation of an Apparatus Comprising a Module Equipped with a Vacuum Device Capable of Controlling the Translation of the Piston The optical lens (20) having a radius of curvature of 120 mm (convex face) and a diameter of 65 mm is placed on the lens carrier (7) in the module (1) with its convex face upwards (the upper end (1a) of the module (1)). The module is sealed by the flexible planar film (30) held in the film carrier (8) by the holding device (9). The flexible film is a commercial film (ARclear® DEV-8796—Adhesives Research, Inc.) made of PET having a thickness of 75 µm in thickness, coated with a layer of adhesive substance (pressure-sensitive adhesive—PSA) in a thickness of 25 µm.

The removable heating unit (200) is placed on the module (1). This unit makes it possible, by hot air convection, to raise the temperature of the film sealing the module. In this fashion, the film is brought to a temperature of 160° C. Once the desired temperature is reached, the heating unit is moved in order to allow the implementation of the stamp.

The ovoid silicone stamp (11) is hollowed (having a radius of curvature of approximately 43 mm and a Shore 00 hardness of 38) pre-deforms the heated flexible planar film up to a pressure threshold P1 set to 10 N. The speed of descent of the stamp is set to 14 mm/sec. Once the threshold P1 is reached, the vacuum engages in the vacuum chamber (4) of the module by implementation of the vacuum device (5) (0.5 bar vacuum). Consequently, the piston engages in an ascending vertical translational movement allowing initiation of the contact between the optical lens and the film.

The stamp impacts upon the film/adhesive/lens assembly in such a manner as to propagate the conformal contact until a pressure threshold P2, set to 200 N, is attained. The speed of descent V1 of the stamp is set at 14 mm/sec. The different pressure, speed and temporization parameters are controlled and managed by a programmed sequence recorded in an automatic device (15).

The threshold P2 is maintained during a temporization $t_2$ of 5 seconds. Then the stamp rises at a speed V2 of 14 mm/sec and the vacuum is interrupted in the vacuum chamber of the module. The film is adhered to the lens; it is cut to the diameter of the lens, making it possible to obtain a functionalized optical lens over its entire surface.

Example 4

Adhesion of a Film on the Concave Face of an Optical Lens with Thermal Assistance—Implementation of an Apparatus Comprising a Module Equipped with a Vacuum Device Capable of Controlling the Translation of the Piston This example is similar to Example No. 3 and is applicable to a lens having a radius of curvature of 214 mm (concave face) and a diameter of 65 mm. It is placed on the lens carrier in the module, concave face upwards, in such a way as to effect the adhesion of the film onto the concave face. The film used is the same film used in Example No. 3.

The parameters for heating the film are the same as those used in Example No. 3.

The stamp used is ovoid in shape, has a radius of curvature of approx. 35 mm, and has a Shore A hardness 8.

The adhesion sequence is the same as that of Example No. 3; the pressure thresholds are different: P1=10 N, P2=180 N.

Example 5

Adhesion of a Polarizing Film in the Convex Face of an Optical Lens Using Continuous Thermal Assistance. Implementation of an Apparatus Comprising a Mechanical Piston The optical lens (20) having a radius of curvature of 133 mm (convex face) and a diameter of 65 mm is placed on the lens carrier (7) in the module (1).

The flexible planar polarizing film (30) is positioned on the film carrier (8).

The polarizing film is a commercial film made of TAC/PVA/TAC—triacetate of cellulose/polyvinylalccol/triacetate of cellulose) (TEQ 1465 DU Nitto Denko) having a thickness of 110 µm, coated with a layer of adhesive substance (pressure-sensitive adhesive) of a thickness of 20 µm.

The removable heating unit (200) is placed on the film carrier. This unit makes it possible, by hot air convection, to raise the temperature of the polarizing film to 100° C.

Once this temperature is reached, the assembly comprising the film carrier (8), polarizing film (30) and the heating unit (200) is positioned on the module (1) and blocked by a holding device (9). The module (1) is thus sealed by the polarizing film (30).

The ovoid silicone stamp (11), hollowed out (having a radius of curvature of approx. 43 mm and a Shore 00 hardness 54) executes a descending vertical translational movement, in order to make contact with the polarizing film up to a position threshold Z1 that corresponds to the pre-deformation of the polarizing film by the stamp. This threshold Z1 is −30 mm (measured on the axis (y) relative to the initial relative position from the center of the film blocked at the film carrier).

The initiation of the conformal contact between the optical lens and the film is done by an ascending vertical translational movement of the mechanical piston (2) carrying the lens carrier, at a speed V0 of 3 mm/sec.

This ascending vertical translation is continued up to a position threshold Z2 corresponding to a complete conformal contact between the lens/adhesive/film assembly. This threshold Z1 is +10 mm (measured on the axis (y) relative to the initial relative position from the center of the film blocked at the film carrier). This position threshold Z2 corresponds to a target pressure P2 of 80 N. The threshold P2 is maintained during a temporization $t_2$ of 5 seconds.

The heating unit is stopped.

The stamp (11) rises at a speed V1 of 14 mm/sec, and then the module is opened.

The film adhered on the lens is cut to the diameter of the lens, making it possible to obtain a polarized optical lens over its entire surface.

Example 6

Adhesion of a Multifunctional (HMC) Film on the Convex Face of an Optical Lens with a Progressive Surface with Continuous Thermal Assistance. Implementation of an Apparatus Comprising a Mechanical Piston The optical lens (20) has a base 4.00 progressive Varilux Comfort® surface as its convex surface and in addition 3.50 D and a diameter of 65 mm.

The optical lens is placed on the lens carrier (7) in the module (1).

The HMC film (30) is positioned on the film carrier (8).

The HMC film is a commercial multi-functional film manufactured by Eyesaver comprising a triacetate cellulose film with a thickness of 80 µm and having on one face a Hard Multi Coat (HMC) stack (anti-scratch coating+anti-reflecting treatment+dirt repellant treatment) and on the other face a layer of adhesive substance (pressure-sensitive adhesion).

The removable heating unit (200) is placed on the film carrier. This unit makes it possible, by hot air convection, to raise the temperature of the HMC film to 160° C.

Once the desired temperature is reached, the assembly comprising the film carrier (8), HMC film (30) and the heating unit (200) is positioned on the module (1) and blocked by a holding device (9). The module is thus sealed by the HMC film (30).

The ovoid silicone stamp (11), hollowed out, (having a radius of curvature of approx. 43 mm and a Shore 00 hardness 54) executes a descending vertical translational movement, in order to make contact with the HMC film up to a position threshold Z1 that corresponds to the pre-deformation of the polarizing film by the stamp. This threshold Z1 is −15 mm (measured on the axis (y) relative to the initial relative position from the center of the film blocked at the film carrier).

The initiation of the conformal contact between the optical lens and the film is done by an ascending vertical translational movement of the mechanical piston (2) carrying the lens carrier, at a speed V0 of 10 mm/sec.

This ascending vertical translation is continued up to a position threshold Z2 corresponding to a complete conformal contact between the lens/adhesive/film assembly. This threshold Z1 is +20 mm (measured on the axis (y) relative to the initial relative position from the center of the film blocked at the film carrier). This position threshold Z2 corresponds to a target pressure P2 of 90 N.

The target threshold P2 is maintained during a temporization $t_2$ of 5 seconds.

The heating unit is stopped.

The stamp rises at a speed V2 of 14 mm/sec. The module is opened.

The film adhered to the lens is cut to the diameter of the lens, making it possible to obtain an optical lens covered with a multi-functional treatment (HMC) over its entire surface.

The invention claimed is:

1. The process of functionalizing an optical lens by a conforming apparatus for conforming a functionalized flexible planar film onto an optical lens, characterized in that it comprises:
    a module comprising a mechanical piston and a plate mounted above said mechanical piston;
    said piston being capable of presenting a vertical translational movement along the axis (y), within said module;
    a mechanical anti-return device for said piston capable of blocking the plate at a determined height on the inside of the module;
    a lens-holder positioned on the top face of the plate, comprising a holding device for an optical lens;
    a film carrier capable of holding a flat flexible film, said film carrier comprising a holding device making it possible to position and locking said film carrier on the module at its upper end (Ia), the locking involving the hermetic closure of said module;
    a stamp situated vertical to the module;
    electrical, pneumatic or mechanical translation devices connecting said stamp to a support shaft, said devices being capable of effecting controlled vertical and/or horizontal movements of the stamp;
    actuation of the stamp, the piston, the translation devices, according to a predetermined sequence and governed by an automatic device makes it possible to establish the contact between the stamp, the flexible planar film and the optical lens until obtaining a conformal contact between said optical lens and said film, wherein said process comprises the following steps:
    a) contact with the stamp and the planar film under the action of the translation devices and preforming of said film by the application of a mechanical force up to a threshold P1 or a position threshold Z1 controlled by a force sensor and/or position sensor, wherein the force threshold P1 is between 1 N and 200 N;
b) activation of the piston in the module involving an ascending vertical translational movement at a speed of VO of the optical lens up to initiation of the contact between the preformed film and said lens;
c) maintenance of the ascending vertical translation of the optical lens by the action of the piston until attaining the target force threshold P2 or the position threshold Z2 controlled by the force sensor and/or the position sensor involving the propagation and establishment of the conformal contact between the face of the lens to be treated and the film;
d) maintenance of the lens/film conformal contact during a temporization time $t_2$;
e) ascending vertical translation of the stamp at a speed V2;
f) interruption of the pressure applied to the piston; and
g) opening of the module.

2. The process according to claim 1, wherein the apparatus further comprises an adapter base comprising:
module fixation device at its lower end (Ib),
mechanical device making possible a horizontal translation (along the x axis) of said module on said adapter base said adaptor base being connected to a position sensor capable of controlling the relative position along the axis (y) or the module relative to the stamp.

3. The process according to claim 1, wherein the electrical, pneumatic, or mechanical translation devices of the apparatus are under the control of a force sensor and/or position sensor.

4. The process according to claim 1, wherein the apparatus comprises in addition a vacuum device in the module used to eliminate air bubbles present at the film/lens interface.

5. The process according to claim 1, wherein the apparatus comprises in addition a thermal or ultraviolet irradiation polymerization unit.

6. The process according to claim 1, wherein the apparatus comprises in addition a removable unit for heating the film by convection and/or by radiation, said unit being controlled by an automatic device capable of controlling the temperature and the distance applied between the film and the heating unit.

7. The process according to claim 6, wherein the removable heating unit of the apparatus adopts a configuration that makes it possible for it to encompass the stamp in its structure.

8. The process according to claim 1, wherein the flexible planar film comprises at least one functionality chosen from among a structural, optical, physical, and physiochemical functionality.

9. The process according to claim 8, wherein the film comprises at least one functionality chosen from among a function providing protection against photodegradation or photo-oxidation, a shock-absorbing function, an anti-scratch function, an anti-reflection function, a polarizing function, a color filtration function, a photochromic function, an antistatic function, a dirt repellant function, a function provided by a pixelized or microstructured structure.

10. The process according to claim 1, wherein the stamp of the apparatus has a hardness of between 30 Shore 00 and 75 Shore 00.

11. The process according to claim 10, wherein the stamp of the apparatus has a hardness of between 38 Shore 00 and 64 Shore 00.

12. The process according to claim 1, wherein the force threshold P1 is between 20 N and 100 N.

13. The process according to claim 1, wherein the temporization $t_2$ is between 0 seconds and 20 seconds.

14. The process according to claim 13, wherein the temporization $t_2$ is between 1 second and 8 seconds.

15. The process according to claim 1, wherein the speed VO of ascending vertical translation of the optical lens is between 0.5 and 100 mm/s.

16. The process according to claim 1, wherein the target force threshold P2 is between 20 N and 800 N.

17. The process according to claim 16, wherein the target force threshold P2 is between 50 N and 300 N.

18. The process according to claim 1, wherein the temporization t2 is between 0 seconds and 120 seconds.

19. The process according to claim 18, wherein the temporization $t_2$ is between 1 second and 10 seconds.

20. The process according to claim 1, wherein the speed V2 of ascending vertical translation of the stamp is between 0.5 mm/s and 50 mm/s.

21. The process according to claim 20, wherein the speed V2 of the stamp is between 1 mm/s and 20 mm/s.

22. A process of functionalization by molding of a functionalized flexible planar film onto an optical lens according to claim 1, characterized by the following steps:
a) positioning of the lens on the lens carrier on the inside of the module, said lens comprising a coating capable of being molded on its face to be treated;
b) positioning of a flexible planar film comprising a structural and/or geometric functionality in the film carrier, said functionality being situated on the inside face of the film;
c) positioning of the film carrier on the upper end (Ia) of the module and closure of said module;
d) positioning of the module vertically above the stamp with alignment of their respective geometric centers under the control of mechanical devices contained in the adaptor connection of said module;
e) establishment of the conformal contact between the face of the lens to be treated and the film by attaining the target force P2 (or the position threshold Z2);
f) release of the stamp from the film/lens entity;
g) opening of the module;
h) disassembly of the film and the optical lens, said lens comprising a geometric or structural functionality imprinted of that present on the functionalized flexible planar film using in step (a).

23. A process of functionalization by transfer of a functionalized flexible planar film onto an optical lens according to claim 1, characterized by the following steps:
a) positioning of the lens on the lens carrier on the inside of the module;
b) positioning of a flexible planar film comprising a structural, geometric, optical, physical and/or physiochemical functionality in the film carrier, said functionality being situated on the inside face of the film;
c) positioning of the film carrier on the upper end (Ia) of the module and closure of said module;
d) positioning of the stamp vertically above the module with alignment of their respective geometric centers under the control of mechanical devices contained in the adaptor connection of said module;
e) establishment of the conformal contact between the face of the lens to be treated and the film by attaining the target force P2 (or the position threshold Z2);
f) release of the stamp from the film/lens entity;
g) opening of the module;
h) peeling the film on the surface of the optical lens, said lens comprising the entirety of the geometric, structural, optical, physical and/or physiochemical functionality present on the functionalized flexible planar film used in step a).

24. A process of functionalization by adhesion of a functionalized flexible planar film onto an optical lens according to claim 1, characterized by the following steps:
- a) deposition of the adhesive substance on the inside face of the film and/or on the face to be treated of the optical lens;
- b) positioning of the lens on the lens carrier on the inside of the module;
- c) positioning of the flexible planar film comprising the structural, optical, physical, and/or physiochemical functionality in the film carrier, said functionality being situated on the inside face of the film and/or the outside face of the film and/or in the thickness of the film;
- d) positioning of the film carrier on the upper end (Ia) of the module and closure of said module;
- e) positioning of the module vertically above the stamp under the control of mechanical devices contained in the adapter base of said module;
- f) establishment of the conformal contact between the face of the lens to be treated and the film by attaining the target force P2 (or the position threshold Z2);
- g) release of the stamp from the film/lens entity;
- h) opening of the module.

25. The process of functionalization by adhesion according to claim 24, wherein the adhesive substance is a pressure-sensitive adhesive.

26. The process according to claim 15, wherein the speed VO of ascending vertical translation of the optical lens is between 1 and 20 mm/s.

* * * * *